United States Patent
Zaverucha et al.

(10) Patent No.: US 10,652,026 B2
(45) Date of Patent: *May 12, 2020

(54) IMPLICITLY CERTIFIED DIGITAL SIGNATURES

(71) Applicant: BLACKBERRY LIMITED, Waterloo (CA)

(72) Inventors: Gregory Marc Zaverucha, Redman, WA (US); David William Kravitz, San Jose, CA (US); Daniel Richard L. Brown, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,930

(22) Filed: Oct. 3, 2018

(65) Prior Publication Data

US 2020/0028694 A1      Jan. 23, 2020

Related U.S. Application Data

(63) Continuation of application No. 13/464,007, filed on May 4, 2012, now Pat. No. 10,110,386.

(60) Provisional application No. 61/495,790, filed on Jun. 10, 2011.

(51) Int. Cl.
    *H04L 9/32*      (2006.01)
(52) U.S. Cl.
    CPC .......... *H04L 9/3252* (2013.01); *H04L 9/3265* (2013.01)
(58) Field of Classification Search
    CPC ........................... H04L 9/3265; H04L 9/3252
    See application file for complete search history.

(56) References Cited

U.S. PATENT DOCUMENTS

| | | | |
|---|---|---|---|
| 6,792,530 | B1 | 9/2004 | Qu et al. |
| 7,269,726 | B1 | 9/2007 | Corella |
| 7,716,139 | B2 | 5/2010 | Brown et al. |
| 2005/0086175 | A1 | 4/2005 | Brique |
| 2005/0089173 | A1 | 4/2005 | Harrison et al. |

(Continued)

FOREIGN PATENT DOCUMENTS

| | | |
|---|---|---|
| CN | 101535845 | 9/2009 |
| CN | 101815289 | 8/2010 |

(Continued)

OTHER PUBLICATIONS

Brumley, Billy Bob; "Implementing Cryptography for Packet Level Authentication"; Security and Management; SAM 2008; Jul. 17, 2008; pp. 475-480.

(Continued)

*Primary Examiner* — Matthew T Henning
(74) *Attorney, Agent, or Firm* — Fish & Richardson P.C.

(57) ABSTRACT

In some aspects, a message and an implicit certificate are accessed. The implicit certificate is associated with an entity. A modified message is generated by combining the message with a value based on the implicit certificate. A digital signature can be generated based on the modified message and transmitted to a recipient. In some aspects, a digital signature from an entity and a message to be verified based on the digital signature are accessed. An implicit certificate associated with the entity is accessed. A modified message is generated by combining the message with a value based on the implicit certificate. The message is verified based on the digital signature and the modified message.

6 Claims, 5 Drawing Sheets

(56) References Cited

U.S. PATENT DOCUMENTS

| | | |
|---|---|---|
| 2005/0193219 A1 | 9/2005 | Van Stone |
| 2008/0069347 A1 | 3/2008 | Brown et al. |
| 2009/0100267 A1 | 4/2009 | Brown et al. |
| 2010/0023771 A1 | 1/2010 | Struik |
| 2010/0095360 A1 | 4/2010 | Pavlovski |
| 2011/0087883 A1 | 4/2011 | Campagna et al. |
| 2011/0145585 A1 | 6/2011 | Campagna |
| 2012/0246465 A1 | 9/2012 | Little |
| 2012/0284508 A1 | 11/2012 | Zaverucha |
| 2012/0314856 A1 | 12/2012 | Zaverucha |
| 2012/0317412 A1 | 12/2012 | Zaverucha |
| 2012/0331287 A1 | 12/2012 | Bowman et al. |
| 2013/0046972 A1 | 2/2013 | Campagna |

FOREIGN PATENT DOCUMENTS

| | | |
|---|---|---|
| CN | 101090316 | 4/2011 |
| WO | 9949612 | 9/1999 |
| WO | 2010/129694 | 11/2010 |

OTHER PUBLICATIONS

D.R.L. Brown, R. P. Gallant, and S. A. Vanstone. Provably secure implicit certificate schemes. In P. F. Syverson, editor, Financial Cryptography, FC 2001, vol. 2339 of Lecture Notes in Computer Science, pp. 156-165. Springer, Feb. 2001. Available at http://www.cacr.math.uwaterloo.ca/techreports/2000/corr2000-55.ps. (12 pages).

D.R.L. Brown, M.J. Campagna and S.A. Vanstone. Security of ECQV-Certified ECDSA Against Passive Adversaries. IACR Cryptology ePrint Archive: Report 2009/620. Dated Mar. 9, 2011. 16 pages. Available at http://eprint.iacr.org/2009/620.pdf.

J.S. Coron, Y. Dodis, C. Malinaud and P. Puniya. A new Design Criteria for Hash Functions. Proceedings of CRYPTO'05, Springer 2005, (15 pages), http://www.cs.nyu.edu/~dodis/ps/nist.pdf.

D. Wagner, "A generalized birthday problem," In M. Yung, editor, Advances in Cryptology—CRYPTO 2002, LNCS 2442, pp. 288-303. IACR, Aug. 2002, http://www.iacr.org/archive/crypto2002/24420288/24420288.pdf.

M. Campagna and G. Zaverucha, "A Cryptographic Suite for Embedded Systems (SuiteE)," IETF Internet Draft, Version 01, dated Apr. 19 2011, 39 pages, http://tools.ietf.org/search/draft-campagna-suitee-01.

I. Damgard. A design principle for hash functions. In Gilles Brassard, editor, CRYPTO'89, vol. 435 of LNCS, pp. 416-427. Springer-Verlag, 1990.

D. Hankerson, A. Menezes, S. Vanstone. Guide to Elliptic Curve Cryptography, Springer-Verlag, New York, 2004, 332 pages.

ISO/IEC 9796-3:2006: Information technology—Security techniques—Digital signature schemes giving message recovery—Part 3: Discrete logarithm based mechanisms, 2006, (78 pages).

J. Kelsey and T. Kohno. Herding hash functions and the Nostradamus attack. In Serge Vaudenay, editor, EUROCRYPT 2006, vol. 4004 of LNCS, pp. 183-200. Springer-Verlag, 2006. Available at http://eprint.iacr.org/2005/281.pdf.

R.C. Merkle. One way hash functions and DES. In Gilles Brassard, editor, CRYPTO'89, vol. 435 of LNCS, pp. 428-446. Springer-Verlag, 1990.

G. Neven, N. Smart and B. Warinschi. Hash function requirements for Schnorr signatures. Journal of Mathematical Cryptology 3 (2010), (19 pages). Available at http://www.zurich.ibm.com/%7Enev/papers/schnorr.pdf.

R. Housley and W. Ford and W. Polk and D. Solo. RFC 2459: Internet X.509 Public Key Infrastructure Certificate and CRL Profile. IETF RFC, Jan. 1999, 105 pages. Available at www.ietf.org/rfc/rfc2459.txt.

A. Menezes, P. van Oorschot, S. Vanstone. Handbook of Applied Cryptography, CRC Press, Boca Raton, 1997, (781 pages).

L.A. Pintsov and S.A. Vanstone. Postal revenue collection in the digital age. Proceedings of Financial Cryptography and Data Security (FC'00), LNCS 1962 (2001), 105-120. Available at http://www.postinsight.pb.com/files/POST_REV.pdf.

IEEE P1363a-2004, IEEE Standard Specifications for Public-Key Cryptography—Amendment 1: Additional Techniques, 2004, 168 pages.

C. P. Schnorr. Efficient identification and signatures for smart cards. In Gilles Brassard, editor, CRYPTO'89, vol. 435 of LNCS, pp. 239-252. Springer-Verlag, 1990.

C. P. Schnorr. Efficient signature generation by smart cards. Journal of Cryptology, 4(3):161-174, 1991.

Standards for Efficient Cryptography Group. SEC 4: Elliptic Curve Qu-Vanstone Implicit Certificate Scheme (ECQV). Draft Document, Version 0.97, Mar. 2011, (32 pages).

Standards for Efficient Cryptography Group. SEC 1: Elliptic Curve Cryptography Version 2.0, 144 pages, May 2009.

ANSI X9.62-2005: Public Key Cryptography for the Financial Services Industry: The Elliptic Curve Digital Signature Algorithm (ECDSA). Accredited Standards Committee X9, Inc., 2005, (163 pages).

ANSI Draft X9.92-1-2009: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2009, (47 pages).

Smart, N.P. et al.; "A Wearable Public Key Infrastructure (WPKI)"; The Fourth International Symposium on Wearable Computers; Atlanta, Georgia; Oct. 16-17, 2000; IEEE Computer Society; Oct. 16, 2000; pp. 127-133.

Shao et al., "Self-Certified Signature Scheme from Pairings"; The Journal of Systems and Software 80, vol. 80, No. 3; Feb. 4, 2007; pp. 388-395.

Lim C., Lee P. The Korean certificate based digital signature. Comput Electr Eng 1999; 25(4):249-65.

Rabadi, Nader M.; "Revised Self-Certified Implicit Certificate Scheme for Anonymous Communications in Vehicular Networks"; 2010 IEEE Vehicular Networking Conference; Dec. 13, 2010; pp. 286-292.

Extended European Search Report issued in European Application No. 12166817.2 dated Oct. 23, 2012; 7 pages.

Extended European Search Report issued in European Application No. 12166821.4 dated Oct. 31, 2012; 7 pages.

Communication Pursuant to Article 94(3) EPC issued in European Application No. 12166821.4 dated Jun. 25, 2013; 4 pages.

Communication Pursuant to Article 94(3) EPC issued in European Application No. 12166817.2 dated Jul. 1, 2013; 5 pages.

Communication Pursuant to Article 94(3) EPC issued in European Application No. 12166817.2 dated Dec. 19, 2013; 6 pages.

Summons to Attend Oral Proceedings issued in European Application No. 12166817.2 on Feb. 28, 2017.

Communication Pursuant to Article 94(3) EPC issued in European Application No. 12166821.4 dated Mar. 15, 2017.

International Search Report and Written Opinion of the International Searching Authority issued in International Application No. PCT/US2012/036541 dated Oct. 23, 2012; 12 pages.

International Preliminary Report on Patentability under Chapter I issued in International Application No. PCT/US2012/036541 dated Dec. 27, 2013; 8 pages.

International Search Report and Written Opinion of the International Searching Authority issued in International Application No. PCT/US2012/036535 dated Oct. 31, 2012; 11 pages.

International Preliminary Report on Patentability under Chapter I issued in International Application No. PCT/US2012/036535 dated Dec. 27, 2013; 7 pages.

Office Action issued in U.S. Appl. No. 13/464,007 dated Jul. 14, 2017.

Office Action issued in U.S. Appl. No. 13/464,007 dated Jan. 30, 2018.

United States Notice of Allowance in U.S. Appl. No. 13/463,956 dated Jan. 23, 2018, 8 pages.

United States Notice of Allowance in U.S. Appl. No. 13/463,956 dated Mar. 26, 2018, 10 pages.

United States Advisory Action issued in U.S. Appl. No. 13/464,007 dated May 2, 2018, 3 pages.

(56) References Cited

OTHER PUBLICATIONS

United States Notice of Allowance issued in U.S. Appl. No. 13/464,007 dated Jun. 22, 2018, 8 pages.
United States Notice of Allowance issued in U.S. Appl. No. 13/463,965 dated Aug. 24, 2018, 7 pages.
Office Action issued in Canadian Application No. 2,838,675 dated Feb. 2, 2016.
Office Action issued in Canadian Application No. 2976795 dated Jun. 18, 2018, 4 pages.
Office Action issued in Chinese Application No. 201280039063.7 dated Feb. 14, 2016.
Office Action issued in Chinese Application No. 201280039062.2 dated Jun. 1, 2016.
Office Action issued in Chinese Application No. 201280039063.7 dated Aug. 24, 2016.
Rejection Decision issued in Chinese Application No. 201280039063.7 dated Dec. 2, 2016.
Rejection Decision issued in Chinese Application No. 201280039062.2 dated Nov. 30, 2016.
Reexamination Notification issued in Chinese Application No. 201280039062.2 dated Feb. 28, 2018, 9 pages.
Examination Search Report issued in Canadian Application No. 2976795 dated Apr. 23, 2019, 4 pages.

IMPLICITLY CERTIFIED DIGITAL SIGNATURES

CROSS-REFERENCE TO RELATED APPLICATIONS

This application is a continuation of U.S. application Ser. No. 13/464,007, entitled "Implicitly Certified Digital Signatures," filed on May 4, 2012, which claims priority to U.S. Provisional Application Ser. No. 61/495,790, entitled "Implicitly Certified Digital Signatures," filed on Jun. 10, 2011, the entire contents of each are hereby incorporated by reference.

BACKGROUND

This specification relates to using implicit certificates in a cryptography system. Cryptography systems can provide secure communication over public channels. For example, digital signature schemes can be implemented in a public key cryptography system. In some cryptography systems, users verify the authenticity of other users' digital signatures based on certificates issued by a trusted third party.

BRIEF DESCRIPTION OF THE DRAWINGS

Like reference numbers and designations in the various drawings indicate like elements.

DETAILED DESCRIPTION

Public keys, digital signatures, or both can be generated and/or used according to techniques that reduce the likelihood that certain attacks will succeed against a cryptographic scheme based on implicit certificates. In some instances, one or more techniques can be implemented as a countermeasure against chaining attacks or other types of attacks. The countermeasures may represent a class of solutions that each can be used to effectively thwart the ability of an adversary to forge implicit certificates or signatures associated with implicitly certified public keys. The techniques may be implemented effectively, for example, in cases where the relying party is an end entity within a public key infrastructure, in cases where the relying party is a certificate authority that is subordinate to another certificate authority, or in other cases.

As such, an implicit certificate scheme may include one or more countermeasure components. In some instances, a countermeasure component is applied in the algorithm used for reconstruction of a subject public key from its implicit certificate. Some example countermeasure techniques that can be applied in the public key construction formulae are described below with respect to FIGS. 2 and 4. In some instances, a countermeasure component is applied in the algorithm used for implicit-certificate-based verification of a digital signature on a message. Some example countermeasure techniques that can be applied to the digital signature generation and verification formulae are described below with respect to FIGS. 3 and 5. In some instances, a combination of these and additional or different countermeasure components are used.

Figure 1:
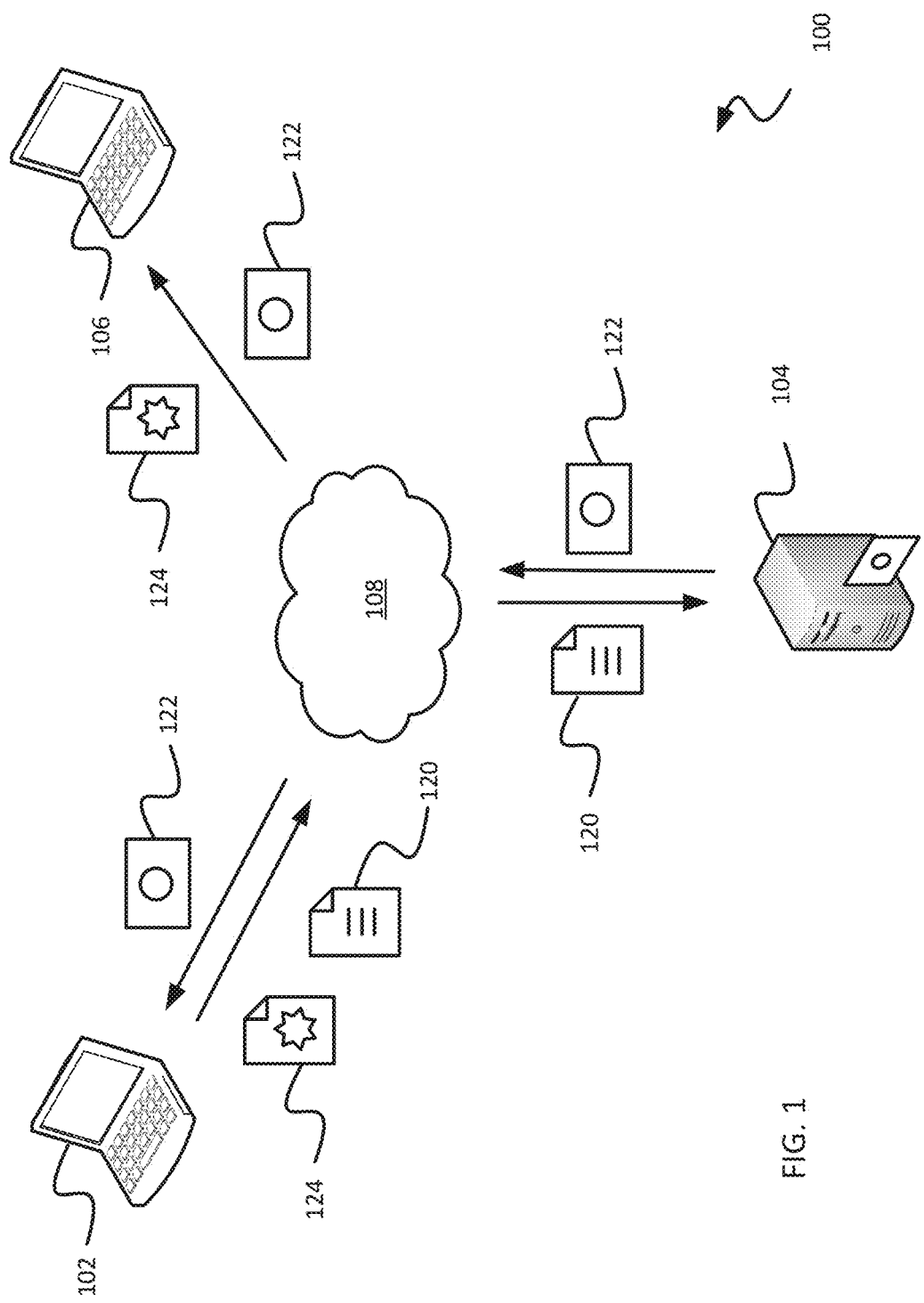
FIG. 1 is a schematic diagram of an example data communication system.

FIG. 1 is a schematic diagram of an example data communication system 100, showing an example context where an implicit certificate-based cryptographic scheme and associated countermeasures can be implemented. Implicit certificate-based cryptographic schemes and associated countermeasures can be implemented in other contexts. The data communication system 100 includes a certificate authority server 104, two terminals 102, 106, and a data network 108. The data communication system 100 can include additional, fewer, or different components. For example, the data communication system 100 may include additional storage devices, additional servers (including additional certificate authority servers), additional terminals, and other features not shown in the figure.

The certificate authority server 104 and the terminals 102, 106 can communicate with each other and with other components of the data communication system 100 over the data network 108. In the example shown in FIG. 1, the terminal 102 can send a certificate request 120 to the certificate authority server 104, and the certificate authority server 104 can respond by sending an implicit certificate 122 to the terminal 102. The terminal 102 can send a signed message 124 to the terminal 106, and the terminal 106 can verify the authenticity of the signed message 124 using the implicit certificate 122 issued by the certificate authority server 104. The data communication system 100 can support additional or different types of communication. In some implementations, the terminals 102, 106 can also exchange encrypted messages and other types of information with each other, with the certificate authority server 104, and with other components of the data communication system 100.

In some implementations, the signed message 124 includes an implicitly certified signature. The implicitly certified signature can be a digital signature on the message, or the implicitly certified signature can be a digital signature on a modified version of the message. The message can be signed and verified with an implicitly certified key pair. Implicit certificate schemes, and signature schemes that use implicit certificates, can be parameterized based on a desired level of security, which can be represented as K, for example, in bits. Examples of implicit certificate schemes include Elliptic Curve Qu-Vanstone (ECQV) Implicit Certificate Schemes and Optimal Mailing Certificate (OMC) Implicit Certificate Schemes. Additional or different implicit certificate schemes may be used. Examples of digital signature schemes that can utilize implicit certificates include the Elliptic Curve Pintsov-Vanstone (ECPV) signature scheme, the Keyed ECPV Signature Scheme, and the Schnorr Signature Scheme. Additional or different digital signature schemes may be used.

The ECPV signature scheme is a signature scheme with partial message recovery. The standards ANSI X9.62, IEEE P1363a, and ISO 9796-3 specify example implementations of the ECPV signature scheme (with 2K-bit output hash functions). Suite E specifies an example of ECPV signatures with K-bit output (specifically, AES-128-MMO). The keyed variant of the ECPV signature scheme allows the signer to encrypt the recoverable part of the signed message in such a way that only the intended recipient may recover it. Other parties may still verify the signature on the public part of the message.

The ECQV implicit certificate scheme is an example implicit certificate scheme. An implementation of the ECQV scheme is described in the Standards for Efficient Cryptography 4 (SEC 4) Standard, Version 2.0, published in May 2009 by the Standards for Efficient Cryptography Group (SECG). The SEC 4 standard specifies use of a hash function with 2K-bit output. Suite E also specifies ECQV, but with a short (K-bit) hash function, AES-128-MMO.

In some aspects, implicit certificates can enable a relying party to make use of a public key infrastructure without the need for explicit conveyance of the public key to the relying party. The public key can be used within a cryptographic protocol, such as for the purpose of verifying the integrity and authenticity-of-origin of messages that are purported to have been signed by the owner of that public key. As compared to explicit certificates that include within the body of the certificate the subject public key, subject identifier, and a certificate authority-generated digital signature over at least the subject public key and subject identifier, an implicit certificate can be more compact. In some implementations, the implicit certificate does not explicitly contain the subject public key, but enables the subject public key to be reconstructed from the implicit certificate. In some implementations, an implicit certificate may explicitly contain the subject public key. The relying party can use the certificate authority's public key to reconstruct the subject public key.

In the example shown in FIG. 1, the implicit certificate scheme is used by three entities: a certificate authority, a certificate requester, and a certificate processor. In the example shown, the requester entity obtains an implicit certificate from the certificate authority entity. The implicit certificate certifies the requester's identity and allows the processor entity to obtain the requester's public key. More generally, additional or different entities may use an implicit certificate scheme in some contexts.

As an example of an implicit certificate scheme, some implementations of the ECQV implicit certificate scheme can be described in terms of six aspects of operation. These six aspects can be performed in any appropriate order or combination. Moreover, implicit certificate schemes may be implemented with fewer, additional, or different aspects of operation. The description of six example aspects of operation is provided here by way of example.

A first aspect of the ECQV implicit certificate scheme is the ECQV Setup operation. At this stage, the certificate authority establishes the elliptic curve domain parameters, a hash function, the certificate encoding format, and the entities have a random number generator. The certificate authority generates a key pair. The entities receive authentic copies of certificate authority's public key and domain parameters. Any suitable technique can be used to implement the ECQV Setup.

A second aspect of the ECQV implicit certificate scheme is the Certificate Request operation. The certificate requester generates a request for a certificate. The request is sent to the certificate authority. The cryptographic component of the request is a public key, generated using the same procedure that the certificate authority uses during ECQV Setup. Any suitable technique can be used to implement the Certificate Request.

A third aspect of the ECQV implicit certificate scheme is the Certificate Generation operation. Upon receiving the certificate request, the certificate authority confirms the requester's identity, and creates an implicit certificate. The certificate authority entity sends the response to the requester entity. Any suitable technique can be used to implement the Certificate Generation.

A fourth aspect of the ECQV implicit certificate scheme is the Certified Public Key Extraction operation. Given an implicit certificate for the requester entity, the domain parameters, and the certificate authority's public key, the public key extraction algorithm computes the requester's public key. Any suitable technique can be used to implement the Certified Public Key Extraction.

A fifth aspect of the ECQV implicit certificate scheme is the Certificate Reception operation. After receiving a response to the certificate request, the requester computes its implicitly certified key pair, and ensures the key pair is valid. Any suitable technique can be used to implement the Certified Reception.

A sixth aspect of the ECQV implicit certificate scheme is the ECQV Signature Verification operation. In some implementations, the ECQV implicit certificate may be augmented with additional information that forms an explicit signature on the requester's certificate. Any suitable technique can be used to implement the Signature Verification.

In some cases, implicit certificate issuance can be implemented as a two pass protocol between the requester and certificate authority, where the first flow is the certificate request from the requester, and the second flow is the response from certificate authority, containing the certificate.

In an example aspect of operation, the requester entity, the certificate authority, and the verifier (or processor) entity have access to elliptic curve domain parameters (including a generator G of a group), a random number generator, a hash function H, a certificate encoding scheme, valid data types, and any other parameters or functions used to carry out the scheme. Some or all of the parameters and functions can be selected based on a specified security level in the cryptography system. The requester has been assigned a unique identifier 1. The requester generates a request $(I, R_U)$ by selecting a value $k_U \in_R [1,n-1]$ and computing $R_U := k_U G$. Here, $k_U$ can be an integer, G can be a generator of an elliptic curve group, and $R_U$ can be an elliptic curve point in the group. The requester sends the request to the certificate authority. The certificate authority generates an implicit certificate $Cert_U$ based on the request. To generate the request, the certificate authority selects a random value $k \in_R [1, n-1]$ and generates a public key reconstruction data P by computing $P = R_U + kG$. Here, k can be an integer, and P can be an elliptic curve point in the elliptic curve group for which G is a generator. The certificate authority then generates the implicit certificate $Cert_U$ by a certificate encoding routine $Cert_U := Encode(P,I,*)$. The certificate authority then generates a hash value e by computing $e := H_n(Cert_U)$, and a private key contribution value r by computing $r := ek + d_{CA}$ mod n. Here, r represents an integer, the function $H_n$ represents a hash function, and the output of $H_n$ can be an integer mod n. The argument "*" in the Encode( ) function can represent a wildcard to allow the certificate authority to include additional, optional data in the certificate, for example, as described below.

Examples of implicit certificate encoding schemes include the fixed-length field scheme, the minimal ASN.1 encoding scheme, the X.509-compliant ASN.1 encoding scheme, and others. The fixed-length field scheme and the ASN.1 encoding scheme can be used to achieve greater bandwidth efficiency in some cases. The X.509-compliant ASN.1 encoding scheme generates an implicit certificate that can be re-encoded as a standard X.509 certificate (e.g., with or without an explicit signature value). A certificate encoded by the fixed-length field scheme can include a series of fields, each having a fixed length. For example, the entities can all agree on a number of fields $f_n$ in the certificate, an octet length for each of the fields, an index value i indicating which field will contain the public key reconstruction data, and validity rules for each of the field elements. In some implementations, one of the fields in the certificate is the public key reconstruction data, and the other fields can have an open format. For example, the other fields may include values such as the requester's email address, or an expiry date for the implicit certificate.

In an example aspect of operation, the certificate authority sends the requester the private key contribution data r and the implicit certificate $Cert_U$. The requester uses the certificate data to generate the requester's elliptic curve key pair (b,B). The requester can generate the elliptic curve key pair (b,B) by computing the hash value $e:=H_n(Cert_U)$, computing the private key value $b=ek_U+r(\bmod n)$, and computing the public key value $B=eP+C$. The example operations can be adapted or modified for additional or different types of implicit certificate schemes.

In the example shown in FIG. 1, the certificate authority server 104 is a computing system that can perform operations of a certificate authority in a cryptography system. The certificate authority server 104 is generally operable to receive, transmit, process, and store information associated with the cryptography system. Although FIG. 1 shows a single certificate authority server 104, a certificate authority can be implemented using multiple certificate authority servers 104, including server clusters, as well as additional or different types of computing devices other than servers.

The certificate authority server 104 generally includes a data processing apparatus, a data storage medium, and a data communication interface. For example, the certificate authority server 104 may include a processor, a memory, an input/output controller, and/or other features. A memory can include, for example, a random access memory (RAM), a storage device (e.g., a writable read-only memory (ROM), etc.), a hard disk, a buffer memory, or another type of storage medium. The memory can store instructions (e.g., computer code) associated with computer applications, programs and computer program modules, and other resources. The processor can include any type of data processing apparatus, for example, a general purpose micro-processor, a specialized processor, a digital controller, or another type of device. An input/output controller can be coupled to input/output devices (e.g., a monitor, a keyboard, etc.) and to the data network 108. The input/output devices can receive and transmit data in analog or digital form over communication links such as a serial link, wireless link (e.g., infrared, radio frequency, etc.), parallel link, or another type of link.

The data network 108 can include any suitable type of data communication network. For example, the data network 108 can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. The data network 108 can include a tiered structure defined by firewalls or similar features that implement various levels of security.

The terminals 102, 106 are computing devices that can communicate based on communication schemes specified by a data communication system 100. The terminals 102, 106 are generally operable to receive, transmit, process, and store information. Although FIG. 1 shows two terminals 102 and 106, a data communication system 100 may include any number of terminals. The data communication system 100 can include groups or subgroups of terminals that can communicate with each other, but not necessarily with the terminals in other groups or subgroups. The data communication system 100 can include terminals of disparate types, having different types of hardware and software configurations, and in a variety of different locations. In some cases, multiple devices or subsystems can be identified together as a single terminal. The terminals in the data communication system 100 can each utilize an implicit certificate issued by the certificate authority server 104.

The terminals 102 typically include a data processing apparatus, a data storage medium, and a data communication interface. For example, the terminals 102 can include a memory, a processor, and an input/output controller. A terminal can include user interface devices, for example, a monitor, touchscreen, mouse, or keyboard. The memory of the terminal can store instructions (e.g., computer code) associated with computer applications, programs and computer program modules, and other resources.

The terminals 102 can be implemented as handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

A terminal can be associated with a particular user entity, a particular user identity, or any combination thereof. One or more of the terminals can be associated with a human user. In some implementations, the terminals are not associated with any particular human user. One or more of the terminals can be associated with a particular device, a particular location, a particular installation, or other identifying information.

In one aspect of operation, the terminal 102 sends the certificate request 120 to the certificate authority server 104, and the certificate authority server 104 generates the implicit certificate 122 for the terminal 102. The implicit certificate 122 associates a particular public key value with a particular user entity (e.g., the terminal 102, a user associated with the terminal 102, a module implemented at the terminal 102, etc.). The terminal 102 receives the implicit certificate 122 from the certificate authority server 104. When the terminal 102 has a message to send to the terminal 106, the terminal 102 generates a digital signature for the message using the implicit certificate 122. The digital signature is combined with the message to form the signed message 124, which the terminal 102 sends to the terminal 106. In some implementations, the digital signature and the message are sent separately. The terminal 106 receives the signed message 124, obtains the implicit certificate 122, and verifies the digital signature based on the implicit certificate 122. Implicit certificates can also be used in other types of schemes, for example, encryption schemes.

An implicit certificate scheme implemented by the data communication system 100 allows the terminals 102, 106 to communicate with each other in a secure manner, even when communications on the data network 108 are observable by malicious users or when malicious users tamper with the communication system 100 (e.g., by tampering with communications of honest terminals). The implicit certificate 122 binds a user entity associated with the terminal 102 to a particular public key value that can be used to verify digital signatures generated by the terminal 102. The terminal 106 can obtain the implicit certificate 122 to verify that the digital signature was generated by the user entity associated with the terminal 102, and not by an impostor. The terminal 106 can also verify that the implicit certificate 122 was generated by a trusted third party at the certificate authority server 104. In this manner, the implicit certificate 122 can provide confirmation by the trusted third party that the signed message 124 was signed by the user entity associated with the terminal 102 and not by an impostor.

The example implicit certificate 122 includes an identification of the user entity associated with the terminal 102. The example implicit certificate 122 includes information that can be used to construct the user entity's public key. In some cases, using the implicit certificate 122 to verify a digital signature also confirms that the user entity is in possession of the corresponding private key. The example implicit certificate 122 shown in FIG. 1 includes neither an explicit representation of the public key nor an explicit representation of the certificate authority's digital signature. Thus, in some implementations, the implicit certificate 122 is more compact than some other types of digital certificates. In some cases, the implicit certificate 122 includes a digital signature of the certificate authority that allows user entities, for example a user entity associated with the terminal 106, to verify that the implicit certificate 122 was generated by the trusted certificate authority. The certificate authority can, in some cases, require the user entity to prove knowledge of the user entity's private key. In some cases, the implicit certificate 122 includes an explicit representation of the user's public key.

Instead of explicitly representing the public key of the terminal 102, the example implicit certificate 122 in FIG. 1 includes public key reconstruction data that can be combined with other information (e.g., the certificate authority's public key, etc.) to generate the public key of the user entity associated with the terminal 102. The example implicit certificate 122 is constructed such that successful verification of a digital signature generated by the terminal 102 serves as confirmation that the terminal 102 is in possession of the private key. Thus, according to some implicit certificate schemes, binding of a user entity to its public key and the user entity's knowledge of its private key can be verified in unison during key usage.

Because the example implicit certificate 122 does not include an explicit representation of the public key of the terminal 102, it is possible in some cases for the certificate authority to issue the implicit certificate 122, and for the terminals 102, 106 to use the implicit certificate 122, without ever generating an explicit representation of the public key value. For example, in some elliptic curve cryptography systems, the value of the public key can be expressed $B=eP+C$, and instead of explicitly computing the value of the public key B, the terminals 102, 106 incorporate the values e, P, and C into a larger equation (e.g., a signing equation or a verifying equation) when they use the public key, for example, to generate or verify a digital signature. As such, the public key can potentially be used or generated, in effect, without explicitly computing the pubic key.

Figure 2:
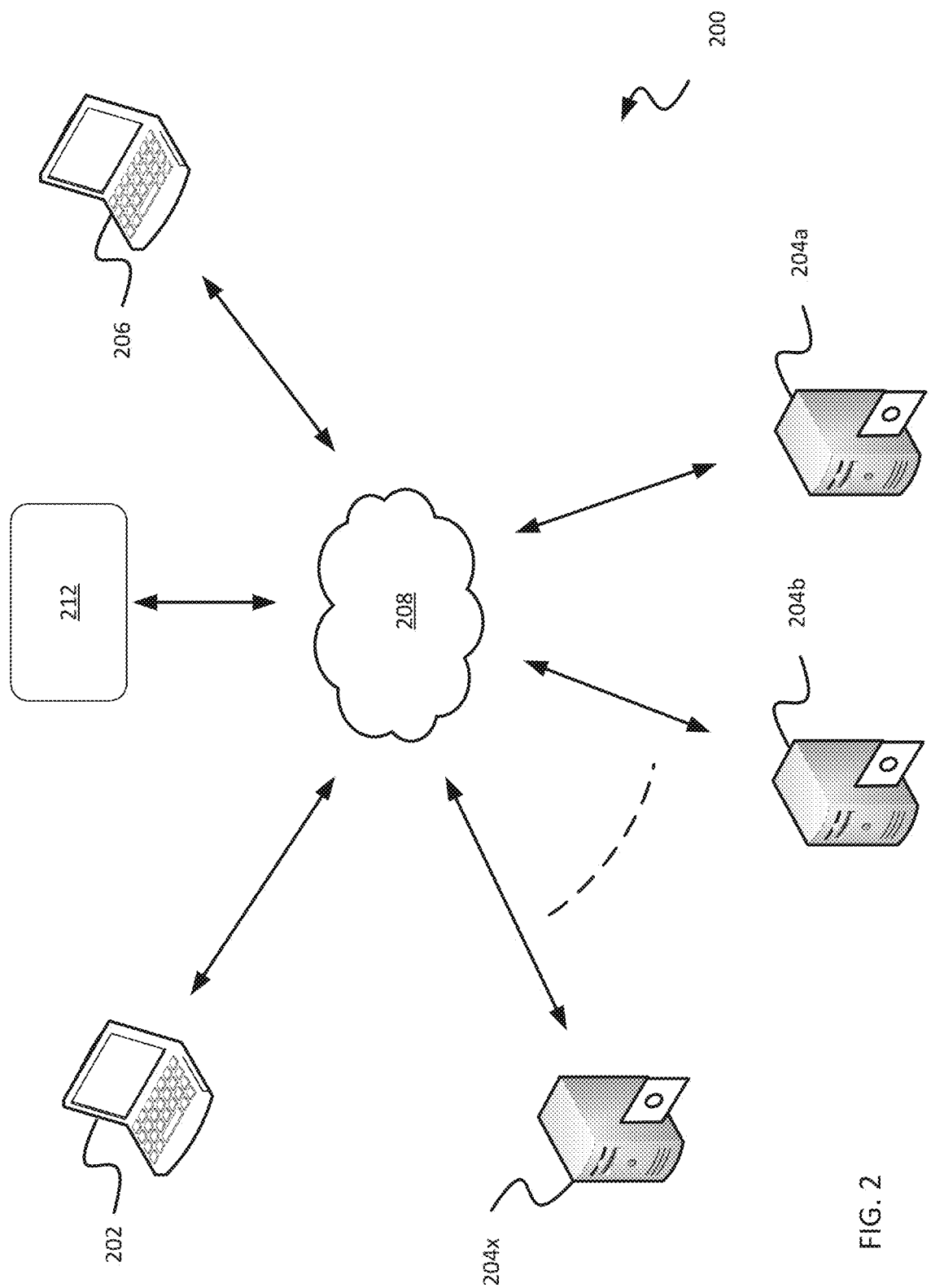
FIG. 2 is a schematic diagram of another example data communication system.

FIG. 2 is a schematic diagram of another example data communication system 200. The data communication system 200 includes certificate authority servers 204a, 204b, and 204x, terminals 202 and 206, a data network 208, and an adversary 212. The data communication system 200 can include additional, fewer, or different components. For example, the data communication system 200 may include additional storage devices, additional servers (including additional certificate authority servers), additional terminals, additional adversaries and other features not shown in the figure. In some example implementations, the terminal 202 can be implemented as the terminal 102 of FIG. 1 and the terminal 206 can be implemented as the terminal 106 of FIG. 1. In some example implementations, each of the certificate authority servers 204a, 204b, 204x can be implemented as the certificate authority server 104 of FIG. 1. The adversary 212 can be implemented as a terminal, a server, or any other suitable computing device or system.

The terminals 202, 206 can exchange messages based on an implicit certificate scheme. For example, the implicit certificate scheme may be used for data authentication, data encryption, or a combination of these and other functions. In some instances, the terminal 202 sends messages to the terminal 206, and the terminal 202 may encrypt the messages, sign the messages, or do both based on an implicit certificate issued by one of the certificate authority servers 204a, 204b, 204x. The adversary 212 can observe communications on the network 208 and launch attacks attempting to compromise security of the implicit certificate scheme. The implicit certificate scheme implemented by the certificate authority servers 204a, 204b, 204x and the terminals 202, 206 includes countermeasures that can thwart certain types of attacks by the adversary 212.

In some cases, the implicit certificate associated with the terminal 202 is issued based on a chain of implicit certificates generated by the certificate authority servers 204a, 204b, 204x. For example, the certificate authority servers 204a, 204b, 204x may include a root certificate authority and multiple subordinate certificate authorities. The chain of implicit certificates may include an implicit certificate for the root certificate authority and implicit certificates for each subordinate certificate authority.

In some example implementations, the implicit certificate scheme implemented in the communication system 200 utilizes public keys derived based on a chain of ECQV implicit certificates. Generally, the root certificate authority or any subordinate certificate authority can issue an implicit certificate. The chain of ECQV implicit certificates can be generated by a combination of the root certificate authority and one or more subordinate certificate authorities, where each subordinate certificate authority has an implicit certificate from a superior certificate authority. The last certificate authority in the chain can issue implicit certificates to user entities (e.g., terminals).

The example ECQV implicit certificate scheme implemented by the communication system 200 can be described using additive notation for a group in which the discrete logarithm problem is believed to be hard, such as an elliptic curve group. The group has order n. In some implementations, the group has prime order. The system parameters include a generator G of the group, which is known and available to all entities using the communication system 200.

In some instances, an ECQV implicit certificate is issued to a user entity represented by or associated with the terminal 202. The user entity's ECQV implicit certificate can be represented by or based on the pair (P,I). The value P is the public key reconstruction data for the user entity, and the value I is the identity information for the user entity. The public key B of the user entity can be reconstructed from the implicit certificate. The user entity interacts with the certificate authority to obtain the ECQV implicit certificate (P,I) and a private key b such that $B=bG$. In some implementations, the user entity's ECQV implicit certificate (P,I) is based on an ECQV implicit certificate chain formed by the certificate authorities.

In some instances, each subordinate certificate authority's reconstructed public key acts as the public key for verifying a certificate that that subordinate certificate authority issued. For example, the root certificate authority may have a private key c, which can be an integer, and a public key C=cG. Each implicit certificate in a chain is denoted by the pair $(P_1, I_j)$ for j from 1 to m+1, where m+1 is the length of the chain. The corresponding public key is denoted $C_j$. Each public key $C_j$, except for $B=C_{m+1}$, is the public key of a subordinate certificate authority. The $l^{th}$ public key can be generated based on a function F according to the equation $$C_l = C_{l-1} + F(C, C_1, \ldots, C_{l-1}, P_1, \ldots, P_l, I_1, \ldots, I_l, *_1, \ldots, *_l) P_l. \tag{1a}$$

These m+1 equations can be combined into a single equation as:

$$B = C_{m+1} = C + F(C, P_1, I_1, *_1) P_1 + \ldots + F(C, C_1, \ldots, C_m, P_1, \ldots, P_{m+1}, \ldots, I_{m+1}, *_1, \ldots, *_{m+1}) P_{m+1} \tag{1b}$$

Here, $*_i$ (for i=1, ..., m+1) has been included to capture the possibility of including additional information in the implicit certificate structure, for example, $(P_j, I_j, *_j)$.

In some instances, the output of the function F in Equations 1a and 1b is generated based on evaluating a hash function or another type of function. For example, the function F can be a hash function, the function F can include one or more hash functions, the function F can invoke one or more hash functions, or the function F can otherwise utilize a hash function or another type of function. In some instances, a hash function is, or is close to, a random function that maps arbitrary inputs to integers between 0 and n. In some instances, a hash function is, or is close to, a random function that maps arbitrary inputs to integers between 0 and $\sqrt{n}$. Examples of hash functions include the SHA family of hash functions (SHA-1, SHA-256, etc.), variants of these functions created by truncating their input, and others. Another example hash function is the MMO hash function, constructed with a block cipher, often AES (the resulting function is called AES-MMO). Other block cipher based hash functions may be suitable as well. A function created by the HMAC construction with a fixed key (published in the domain parameters) is another example function. In some implementations, other MAC functions instantiated with a fixed key, such as CBC-MAC may be used.

Equations 1a and 1b are a general representation of the public key generating formula used in the example implicit certificate scheme implemented in FIG. 2. The function F can take various forms in various implementations. Several specific examples are described below. The function F can be selected so as to thwart attacks by the adversary. In other words, the function F may reduce the likelihood of a successful attack by the adversary in some cases. For example, the functions F can be selected so as to provide improved security over certain conventional schemes in some instances.

According to some conventional schemes, each public key can be reconstructed as follows $$C_j = C_{j-1} + H(P_j, I_j) P_j, \tag{2}$$

where H is a hash function. According to the conventional schemes, these m+1 equations can be combined into a single equation as $$B = C_{m+1} = C + H(P_1, I_1) P_1 + \ldots + H(P_{m+1}, I_{m+1}) P_{m+1} \tag{3}$$

In some instances, this conventional scheme allows an adversary to forge implicit certificates that would be accepted by an unwitting relying party. As such, the adversary could potentially simulate the legitimate action of an entity, such as a certificate authority that is subordinate to another certificate authority, requesting from the superior certificate authority an implicit certificate which will enable the subordinate certificate authority to, in turn, generate an acceptable certificate for a certificate authority that is subordinate to it, or to generate an acceptable certificate for any entity that will use the private key corresponding to the certified public key to, for example, digitally sign a message that is verifiable using the certified public key, or to decrypt an encrypted message that was encrypted using the certified public key. In some cases, the malicious simulation by the adversary requires only passive knowledge of publicly available information, such as the implicit certification system parameters and the public key or implicit certificate of the certificate authority that the adversary falsely claims produced the simulated implicit certificate. In some cases, the scheme represented in Equations 1a and 1b above can be implemented as a successful countermeasure against such attacks.

In some example attacks on the conventional scheme represented by Equations 2 and 3 above, an adversary can successfully use knowledge of a root certificate authority's public key or of a public key of a certificate authority that is subordinate to a root certificate authority to add to that certificate chain four additional links, resulting in the adversary knowing the private key that corresponds to the public key of the fourth added link. In another example attack on the conventional scheme, the adversary adds three links and the digital signature of any single chosen message, and that digital signature verifies correctly using the public key associated with the third added link. In some cases, the scheme represented in Equations 1a and 1b above can be implemented as a successful countermeasure against such attacks.

In some example implementations, the scheme represented in Equations 1a and 1b above may be used to defeat a chaining attack, whereas the scheme represented in Equations 2 and 3 may be vulnerable to the chaining attack. In the chaining attack, the adversary has access to the elliptic curve domain parameters including G (or more generally, the description of the discrete logarithm group and the generator), the public key C of the root certificate authority, and the m+1 identity strings $I_1, \ldots, I_{m+1}$. The output of a successful chaining attack is m+1 public key reconstruction data values $P_1, \ldots, P_{m+1}$ and a private key b corresponding to reconstructed public key $B=C_{m+1}$, that is bG=B.

To implement the chaining attack for an example length-four chain, the adversary accesses inputs including the root certificate authority's public key C and the four identifiers $I_1$, $I_2$, $I_3$, $I_4$. The chaining attack may make assumptions about the hash function H in Equations 2 and 3 above to simplify analysis of when the attack succeeds, but these assumptions are not necessary to enable the attack. For example, the chaining attack may assume the hash function H in Equations 2 and 3 above generates values uniformly in the interval 1 to n. The chaining attack could potentially assume the hash function H in Equations 2 and 3 above generates values not so distributed, for example, values between 0 and $\sqrt{n}$, or values that are biased in some way.

A successful implementation of the chaining attack may generate outputs including the four public key reconstruction values $P_1, P_2, P_3, P_4$ and private key b, such that $$bG = C + H(P_1, I_1) P_1 + H(P_2, I_2) P_2 + H(P_3, I_3) P_3 + (P_4, P_4) P_4. \tag{4}$$

To implement the chaining attack for an example length-four chain, the adversary performs the following actions based on the inputs. Let j range from 1 to 2. Compute $H_{j,k}=I_j)$ where $P_{j,k}=C+kG$, and k ranges from 1 to $n^{1/3}$. Assemble the values $H_{j,k}$ into a list $L_j$. The total computation (for j=1 and j=2) can take time $2n^{1/3}$ scalar multiplies and hash evaluations.

The example chaining attack may continue as follows. Generate a list $L_{1,2}$ of values $(r,s,1+H_{1,r}+H_{2,s}$ mod n, $(H_{1,r})r+(H_{2,s})s$ mod n) such that $1+H_{1,r}+H_{2,s}$ mod $n<n^{2/3}$. This list (which can now replace list $L_1$ and list $L_2$) will have length about $n^{1/3}$, because each list $L_j$ has size $n^{1/3}$ and the probability $H_{1,r}+H_{2,s}$ mod $n<n^{2/3}$ is about $n^{-1/3}$. Not all pairwise comparisons are done. Rather hash tables (high memory) or sorted lists (low memory) can be used. Note that (non-negative) $1+H_{1,r}+H_{2,s}$ can be at most $2n-1$. So $1+H_{1,r}+H_{2,s}$ mod n is either $1+H_{1,r}+H_{2,s}$ or $1+H_{1,r}+H_{2,s}-n$. For $H_{1,r}<n^{2/3}-1$, values that satisfy $0 \leq H_{2,s}<n^{2/3}-1-H_r$ are suitable. Also, values for which $H_{1,r}$, $n-1-H_{1,r} \leq H_{2,s} < \min(n, n+n^{2/3}-1-H_{1,r})$ are suitable.

The example chaining attack may continue as follows. Let j range from 3 to 4. Compute $H_{j,k}=H(P_{j,k},I_j)$ where $P_{j,k}=C+kG$, and k ranges from 1 to $n^{1/3}$. Assemble the values $H_{j,k}$ into a list $L_j$. The total computation (for j=3 and j=4) can take time $2n^{1/3}$ scalar multiplies and hash evaluations. Generate a list $L_{3,4}$ of values $(t,u,-(H_{3,t}+H_{4,u})$ mod n, $(H_{3,t})t+(H_{4,u})u$ mod n) such that $-(H_{3,t}+H_{4,u})$ mod $n<n^{2/3}$. This list can now replace list $L_3$ and list $L_4$.

The example chaining attack may continue as follows. Now find a collision $(r^*, s^*, t^*, u^*)$ in the list $L_{1,2}$ and $L_{3,4}$. Since the third coordinate values in $L_{1,2}$ and $L_{3,4}$ each range from 0 to $n^{2/3}$, and each list has $n^{1/3}$ entries, there should be a collision in some cases. The cost of finding the collision can be kept at around $n^{1/3}$ in some implementations. Finding a collision identifies values $(r^*, s^*, t^*, u^*)$ such that $$(1+H_{1,r^*}+H_{2,s^*} \bmod n)+((H_{3,t^*}+H_{4,u^*}) \bmod n)=0 \bmod n.$$

The example chaining attack may be completed by setting $$b=((H_{1,r^*})r^*(H_{2,s^*})s^* \bmod n)+((H_{3,t^*})t^*+(H_{4,u^*})u^* \bmod n) \bmod n.$$

In some implementations, the example chaining attack described above exploits the generalized birthday attack methodology. For example, the paper entitled "A Generalized Birthday Problem" by David Wagner, published in *Advances in Cryptology—CRYPTO 2002* provides a description of the generalized birthday methodology. Some conventional attacks require time on the order of $n^{1/2}$ which is considerably higher, demonstrating the effectiveness of the attack. For example, comparing $n^{1/2}$ and $n^{1/3}$ for a choice of n having bit length 256 (a common choice in practice), shows a reduction in security from the 128-bit level (if the best attack has cost $n^{1/2}$), down to the 85-bit level (when the best attack has cost $n^{1/3}$).

In some cases, the chaining attack can be extended, as in the example below, to a length-three chain followed by a message signature using the Schnorr algorithm (which is a basis of the PVS algorithm), with signature on message M composed of $(e=H^*(U,M),v)$, as follows:

$$C_1 = C + H(P_1, I_1)P_1$$
$$C_2 = C_1 + H(P_2, I_2)P_2$$
$$B = C_3 = C_2 + H(P_3, I_3)P_3$$
$$U = vG - H^*(U, M)B$$
$$= vG - H^*(U, M)(C + H(P_1, I_1)P_1 + H(P_2, I_2)P_2 + H(P_3, I_3)P_3).$$

To implement the chaining attack in this example scenario, choose the desired value of the message M. Let $P_j=C+p_jG$, for j=1,2,3, and $U=fC+tG$. Solve $$fC=-H^*(U,M)(1+H(P_1,I_1)P_1+H(P_2,I_2)P_2+H(P_3,I_3)P_3)C$$

Or equivalently, $$-fH^*(U,M)^{-1}=1+H(P_1,I_1)P_1+(P_2,P_2)P_2+(P_3,I_3)P_3.$$

The example chaining attack may be continued as follows. Let f=1 and proceed as outlined above for the length-four chain, but using $H^*(U,M)^{-1}$ mod n as the hash function values in place of H on the left hand-side, and solve $$0=1+H^*(U,M)^{-1}+H(P_1,I_1)P_1+H(P_2,I_2)P_2+H(P_3,I_3)P_3$$
(mod n).

Then set v accordingly. For example, v may be set according to $$t=v-H^*(U,M)(H(P_1,I_1)p_1+H(P_2,I_2)p_2+H(P_3,I_3)p_3)$$
(mod n).

Accordingly, these example chaining attacks could potentially compromise the reliability of an implicit certificate scheme, such as the scheme represented by Equations 2 and 3 above. However, the success of such chaining attacks can be avoided or reduced by countermeasures. For example, some or all of the following techniques may be used to defeat the example chaining attacks described above, in some implementations.

Each of the following example public key-generating algorithms can be used as a countermeasure against the chaining attack described above as well as other types of attacks. The following example algorithms are expressed in terms of the ECQV implicit certificate chain described above. These examples can be adapted to other implicit certificate schemes as well. Moreover, the examples are expressed generally for cases where there are multiple certificate authorities (a root certificate authority and one or more subordinate certificate authorities). These examples may be implemented effectively in cases where there is a single certificate authority (e.g., only a root certificate authority). In addition, although the techniques are described as countermeasures, the techniques can be useful or provide advantages even when there is no adversary or threat of attack. As such, the techniques can be used in any context, for example, as countermeasures against attacks or for other purposes.

As a first example countermeasure scheme, the following formulae may be used to generate public keys in some example schemes that utilize an ECQV implicit certificate chain. The following formulae may be utilized as a countermeasure against a chaining attack, as a countermeasure against another type of attack, or for other purposes.

$$C_1 = C + H(P_1, I_1, *_1)P_1$$
$$C_2 = C_1 + H(P_1, I_1, *_1, P_2, I_2, *_2)P_2$$
$$C_3 = C_2 + H(P_1, I_1, *_1, P_2, I_1, *_2, P_3, I_3, *_3)P_3$$
$$\vdots$$
$$B = C_{m+1}$$
$$= C_m + H(P_1, I_1, *_1, \ldots, P_{m+1}, I_{m+1}, *_{m+1})P_{m+1}$$

As a second example countermeasure scheme, the following formulae may be used to generate public keys in some example schemes that utilize an ECQV implicit certificate chain. The following formulae may be utilized as a countermeasure against a chaining attack, as a countermeasure against another type of attack, or for other purposes.

$$C_1 = C + H(P_1, I_1, *_1)P_1 = C + H_1P_1$$

where $H_1 = H(P_1, I_1, *_1)$ $$C_2 = C_1 + H(H(P_1, I_1, *_1), P_2, I_2, *_2)P_2$$
$$= C_1 + H_2P_2$$

$$C_3 = C_2 + H(H(H(P_1, I_1, *_1), P_2, I_2, *_2), P_3, I_3, *_3)P_3$$
$$= C_2 + H_3P_3$$
$$\vdots$$

$$B = C_{m+1}$$
$$= C_m + H(H_m, P_{m+1}, I_{m+1}, *_{m+1})P_{m+1}$$
$$= C_m + H_{m+1}P_{m+1}$$

As a third example countermeasure scheme, the following formulae may be used to generate public keys in some example schemes that utilize an ECQV implicit certificate chain. The following formulae may be utilized as a countermeasure against a chaining attack, as a countermeasure against another type of attack, or for other purposes.

$$C_1 = C + H(C, P_1, I_1, *_1)P_1$$
$$C_2 = C_1 + H(C_1, P_2, I_2, *_2)P_2$$
$$\vdots$$
$$B = C_{m+1}$$
$$= C_m + H(C_m, P_{m+1}, I_{m+1}, *_{m+1})P_{m+1}$$

As a fourth example countermeasure scheme, the following formulae may be used to generate public keys in some example schemes that utilize an ECQV implicit certificate chain. The following formulae may be utilized as a countermeasure against a chaining attack, as a countermeasure against another type of attack, or for other purposes.

$$C_1 = C + H(P_1, I_1, *_1)P_1$$
$$C_2 = C_1 + H(C_1 - C, P_2, I_2, *_2)P_2$$
$$\vdots$$
$$B = C_{m+1}$$
$$= C_m + H(C_m - C_{m-1}, P_{m+1}, I_{m+1}, *_{m+1})P_{m+1}$$

As a fifth example countermeasure scheme, the following formulae may be used to generate public keys in some example schemes that utilize an ECQV implicit certificate chain. The following formulae may be utilized as a countermeasure against a chaining attack, as a countermeasure against another type of attack, or for other purposes. If a hash function is constructed according to the Merkle-Damgard construction, then it has a certain property which makes it non-random, called the length-extension property. If the hash function has the Merkle-Damgard (MD) property, then the following technique may be utilized. The following technique may also be useful in other contexts and situations. Let $H_i$ denote the replacement of the IV (initialization vector) of a standard MD-property hash function by $IV_i$. An initialization vector (IV), is a fixed-size input to a cryptographic primitive that is sometimes required to be random or pseudorandom. When used in hash functions, the IV is typically specified as part of the function, and does not change. Accordingly, $$IV_1 = H(P_1, I_1, *_1)$$

$$IV_2 = H_1(P_2, I_2, *_2)$$

$$IV_3 = H_2(P_3, I_3, *_3),$$

and so forth. Further, $$C_1 = C + H(P_1, I_1, *_1)P_1$$

$$C_2 = C_1 + H(P_2, I_2, *_2)P_2$$

$$C_3 = C_2 + H_2(P_3, I_3, *_3)P_3$$

$$\vdots$$

$$B = C_{m+1}$$
$$= C_m + H(P_{m+1}, I_{m+1}, *_{m+1})P_{m+1}$$

In some instances, a certificate authority, including a root certificate authority or a subordinate certificate authority, can encode any extra needed information within the implicit certificate, but if one does not implicitly trust that certificate authority, one can to go higher up to a certificate authority or relying party that is trusted. This trust model can be "transitive" in that one might trust an entity that presumably checked a higher-up part of the chain, and that entity, in turn might not have independently checked up to a directly trusted (root or intermediate) certificate authority, but rather trusted some other entity to have checked (or trusted) a yet earlier part of the chain. As an example of such extra information, a certificate authority could encode information corresponding to implicit certificates higher up in the chain. If that particular certificate authority is trusted by a particular relying party, then such extra information could save on bandwidth and communications. As an example, in the second example countermeasure scheme above, which includes the formulae:

$$C_1 = C + H(P_1, I_1, *_1)P_1 = C + H_1P_1$$

$$C_2 = C_1 + H(H(P_1, I_1, *_1), P_2, I_2, *_2)P_2$$
$$= C_1 + H(H_1, P_2, I_2, *_2)P_2 = C_1 + H_2P_2$$

$$C_3 = C_2 + H(H(H(P_1, I_1, *_1), P_2, I_2, *_2), P_3, I_3, *_3)P_3$$
$$= C_2 + H(H_2, P_3, I_3, *_3)P_3 = C_2 + H_3P_3$$

$$\vdots$$

$$B = C_{m+1}$$
$$= C_m + H(H_m, P_{m+1}, I_{m+1}, *_{m+1})P_{m+1}$$
$$= C_m + H_{m+1}P_{m+1}$$

some sub-certificate authority $C_j$ (for j=1, . . . , m) could encode $H_{j-1}$ within $*_{j-1}$. If the relying party does not directly trust sub-certificate authority $C_j$, then the relying party can seek independent confirmation of $H_{j-1}$, such as by communicating with earlier certificate authorities or otherwise acquiring earlier implicit certificates and/or hash function output values.

Any of the five example countermeasures outlined above, as well as other example countermeasures, can be modified or adapted. More generally, the $l^{th}$ public key for an ECQV implicit certificate scheme can be generated based on a function F according to the equation $$C_l = C_{l-1} + F(C, C_1, \ldots, C_{l-1}, P_1, \ldots, P_l, I_1, \ldots, I_l, *_1, \ldots, *_l) P_l. \quad (1a)$$

where F is some function that outputs an integer. For example, the function F can be, include, invoke, or otherwise utilize a hash function. Similarly, the $l^{th}$ public key for an OMC implicit certificate scheme can be generated based on a function F according to the equation $$C_l = P_l + F(C, C_1, \ldots, C_{l-1}, P_1, \ldots, P_l, I_1, \ldots, I_l, *_1, \ldots, *_l) C_{l-1}.$$

Figure 3:
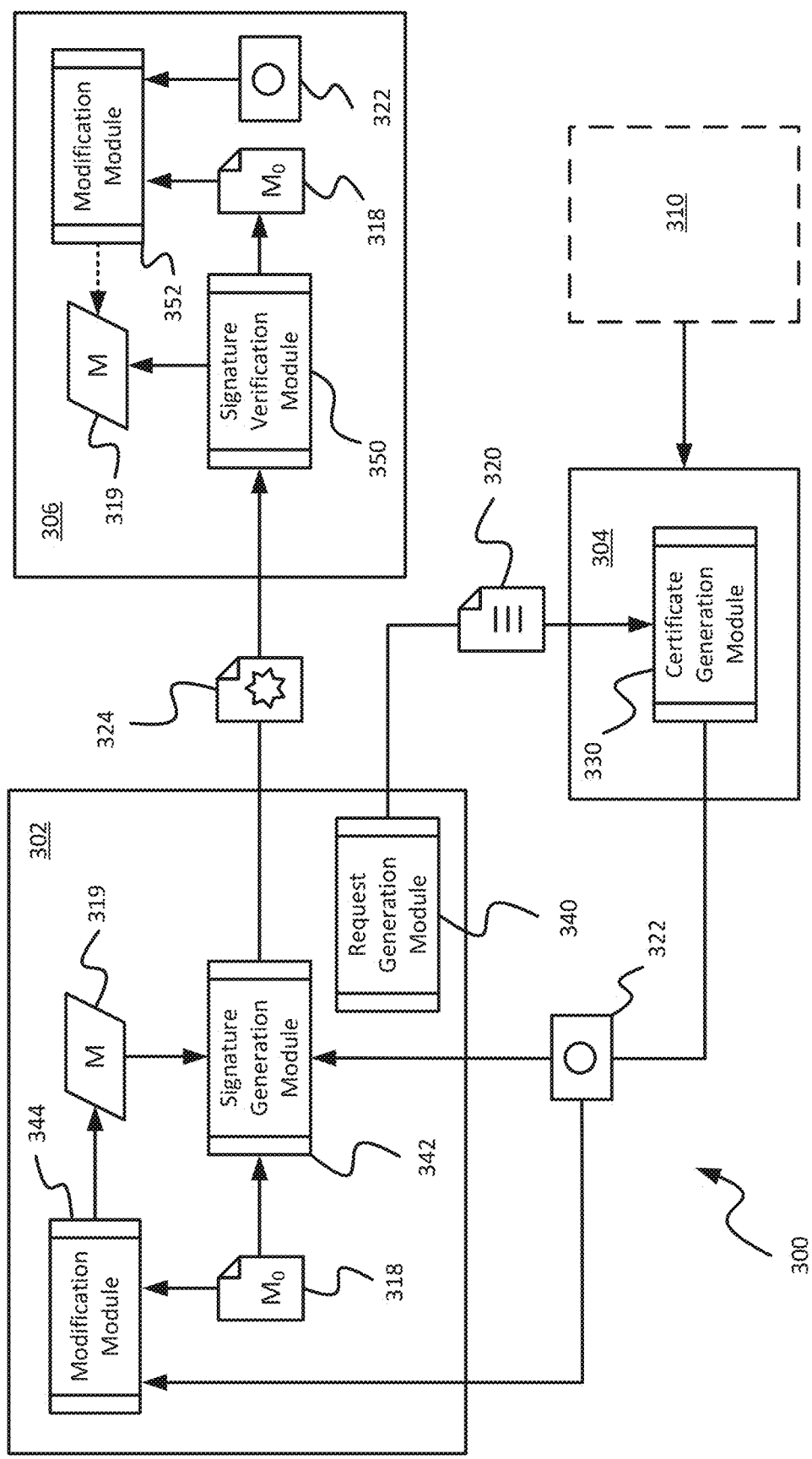
FIG. 3 is a schematic diagram of an example cryptography system.

FIG. 3 is a schematic diagram of an example cryptography system 300 that implements an implicit certificate-based digital signature scheme. The cryptography system 300 includes terminal modules 302, 306, a certificate authority module 304, and possibly additional features. For example, the cryptography system 300 may include one or more additional certificate authority modules 310. The cryptography system 300 can include additional or different components. The terminal modules 302, 306 can each be computer program modules implemented by one or more terminals. For example, the terminal module 302 can be implemented by the terminal 102 of FIG. 1 or the terminal 202 of FIG. 2, and the terminal module 306 can be implemented by the terminal 106 of FIG. 1 or the terminal 206 of FIG. 2.

The certificate authority module 304 can be a computer program module implemented by one or more certificate authority servers. For example, the certificate authority module 304 can be implemented by certificate authority server 104 of FIG. 1 or by any of the certificate authority servers 204a, 204b, 204x of FIG. 2. In some cases, the certificate authority module 304 is operable to perform operations of a subordinate certificate authority, and the additional certificate authority modules 310 are operable to perform operations of a root certificate authority and possibly one or more intermediate certificate authorities. In some cases, certificate authority module 304 is operable to perform operations of a root certificate authority or an intermediate certificate authority.

The terminal modules 302, 306 and the certificate authority module 304 can be implemented by additional or different types of hardware systems. For example, the certificate authority module 304, or in some instances individual modules, data, or other aspects of the certificate authority module 304 can be offloaded to non-certificate authority devices. In some instances, for example in a peer-to-peer computing environment, server functionality can be distributed among client devices. As another example, terminal modules, or in some instances individual modules, data, or other aspects of a terminal module, can be provided on a server device, such as a certificate authority server or another type of server.

The terminal modules 302, 306 and the certificate authority module 304 can communicate with each other, for example, over a data network or another type of communication link. In some implementations, the terminal modules 302, 306 and the certificate authority module 304 can communicate with each other by messages transmitted over the data network 108 of FIG. 1 or the data network 208 of FIG. 2. In the example shown in FIG. 3, the terminal module 302 can send a certificate request 320 to the certificate authority module 304. The certificate authority module 304 can receive the certificate request 320 from the terminal module 302 and send an implicit certificate 322 to the terminal module 302 in response to the certificate request 320. The certificate authority module 304 can also send the terminal module 302 private key contribution data. The private key contribution data can be sent to the terminal module 302 together with or separate from the implicit certificate 322. The certificate authority module 304 may also publish the implicit certificate 322, for example, to a certificate database. The terminal module 302 can receive the implicit certificate 322 from the certificate authority module 304 and send a signed message 324 to the terminal module 306. The terminal module 306 can receive the signed message 324 and the implicit certificate 322 from the terminal module 302. In some cases, the terminal module 306 may retrieve the implicit certificate 322 from another source. The cryptography system 300 can support additional or different types of communications.

The cryptography system 300 utilizes an implicit certificate scheme that allows the terminal modules to verify the authenticity of messages received from other terminal modules. According to the implicit certificate scheme, implicit certificates issued by the certificate authority bind the identity of each user entity to a particular public key value. A user entity can generate digital signatures based on the user entity's private key, and other users can verify the digital signature based on the user entity's public key. Implicit certificate schemes can be implemented based on any suitable type of groups. For example, the ECQV implicit certificate scheme, as well as others, may be implemented using a group of points on an elliptic curve, a multiplicative group of a finite field, or other groups where the discrete logarithm problem may be hard. Examples of elliptic curve-based digital signatures schemes include ECDSA (Elliptic Curve Digital Signature Algorithm), ECPV signatures, and ECNR (Elliptic Curve Nyberg Rueppel). Additional or different types of implicit certificate schemes may be used, such as, for example, an OMC scheme.

When the terminal module 302 signs a message $M_0$, the digital signature for the message $M_0$ may be generated based on M, which is a modified version of the message $M_0$. The modified message M can be formed by combining the message $M_0$ with additional information. For example, the message M may be formed by concatenating the message $M_0$ with a suffix, prefix, or a combination of these and other appendices. The information combined with the message $M_0$ can include the public key used for verifying the message, some portion of the public key used for verifying the message, a function of the public key used for verifying the message, or other information. In some implementations, the information combined with the message $M_0$ includes the signer's implicit certificate or some portion or function of the signer's implicit certificate. In some implementations, the information combined with the message $M_0$ includes a certificate authority's public key, a certificate authority's public key reconstruction value, or other information associated with a certificate authority.

Accordingly, to sign the message $M_0$, the terminal module 302 generates the modified message M from the message $M_0$. For example the modified message M may be generated according to the equation $$M = F_1(M_0, F_2(P, I, [C], *)),$$

where $F_1$ and $F_2$ are some functions. The function $F_2$ can be a hash function or another type of function. For example, the function $F_2$ may generate an integer value based on one or more of the values P,I,[C],*. As an example, the function $F_2$ may generate an integer value based on the values P,I. In some examples, the function $F_2$ may use one or more of the SHA family of hash functions. As another example, the function $F_2$ may concatenate the list of inputs (e.g., by shuffling the order, applying a reversible transformation to the inputs, or otherwise mixing the inputs) and output a single value. The function $F_1$ can be an appending function or another type of function that combines input values. For example, the function $F_1$ may append the output of the function $F_2$ to the message $M_0$ as a prefix, a suffix, or as a combination of these and one or more other types of appendices. As another example, the function $F_1$ may additionally or alternatively apply a reversible transformation, such as character encoding or data compression. The modified message M can be used in the signing function. The signing function can generate a digital signature based on the modified message M, the signer's private key, and the implicit certificate.

A recipient can receive the signed message and use the signer's public key to recover the modified message M from the digital signature. In some instances, the signed message includes the original message $M_0$ and the digital signature based on M. In such cases, the recipient can generate the modified message M based on the message $M_0$ and the public key information that the sender used to generate the modified message M. In some instances, the signed message includes the modified message M and the digital signature based on the modified M. In such cases, the recipient can generate the original message $M_0$ based on the modified message M and the public key information that the sender used to generate the modified message M.

In the example shown in FIG. 3, the public key used to verify the signer's digital signature is implicitly certified. In some instances, generating a digital signature based on the modified message M that has been modified based on the public key (or information relating to the pubic key), rather than generating the digital signature based on the original message $M_0$, may serve as a countermeasure to reduce the likelihood of a successful forgery attack. For example, in some instances this countermeasure may reduce the likelihood of certain types of chaining attacks or other types of attacks that involve the birthday problem. In some instances, this countermeasure may be used as a countermeasure against attacks that do not invoke the birthday problem. For example, this technique may prevent some types of attacks on the combinations of ECDSA with ECQV and with OMC.

The terminal module 302 includes a modification module 344, a signature generation module 342, a request generation module 340, and other possibly other modules. The request generation module 340 can generate a certificate request 320. The certificate request 320 can include an identification 1 of a particular user entity. The certificate request 320 can include an elliptic curve point $R_U$. The certificate request 320 can include additional or different information. The identification value I can be a unique identifier for a particular user entity, a particular device, or both. The request generation module 240 can generate the elliptic curve point $R_U$ by selecting a random number $k_U$ and computing $R_U = k_U G$. For example, the terminal module 302 may have a random number generator module that generates random numbers.

The modification module 344 can use data from or relating to the implicit certificate 322 and the message 318 to generate a modified message 319. The message 318 can include any type of electronic document, data file, data object, or other form of information. In some cases, the message 318 is an e-mail message, an electronic document, or an electronic data file that can be edited and rendered by appropriate software applications. In some cases, the message 318 is a data message or a combination of data messages used in signaling applications among hardware components. For example, the message 318 can include status information from a smart energy meter in a smart energy infrastructure.

The modification module 344 can generate the modified message 319 based on the message 318 and additional information. The additional information can include the implicit certificate 322 or data extracted or otherwise derived from the implicit certificate 322 (e.g., the public key reconstruction value P, the identification value I, or a combination of these and other data). The additional information can include a certificate authority's public key information. For example, the additional information can include the certificate authority's public key C, a public key for any root certificate authority, a public key for any subordinate certificate authority, or any combination of them. The additional information can include a certificate authority's implicit certificate or information derived from any certificate authority's implicit certificate. For example, the additional information can include an implicit certificate for any subordinate certificate authority in a chain, or any combination of them. The modified message 319 can be generated by the modification module 344 by combining the additional information with the message 318. For example, the additional information can be appended to, mixed into, or otherwise combined with the message 318.

The signature generation module 342 can use the implicit certificate 322 to generate a digital signature based on the modified message 319. Example techniques for generating the digital signature include the ECPV Signature Scheme, the Keyed ECPV Signature Scheme, the Schnorr Signature Scheme, ECDSA, and others. The signature generation module 342 can generate the digital signature using the private key of the terminal module 302 and the implicit certificate 322. The signature generation module 342 can generate the private key of the terminal module 302 based on private key contribution data r, the implicit certificate 322, and the random value $k_U$ that was used to generate the certificate request 320. The digital signature generated by the signature generation module 242 can be appended to, combined with, or otherwise associated with the message 318 or the modified message 319 to create the signed message 324. The digital signature can be sent separately from the message 318. The terminal module 302 can send the implicit certificate 322 to the terminal module 306.

The terminal module 306 includes a modification module 352, a signature verification module 350, and possibly other modules. The signature verification module 350 can verify the digital signature associated with the signed message 324. Example techniques for decoding a digital signature based on a public key include the ECPV Signature Scheme, the Keyed ECPV Signature Scheme, the Schnorr Signature Scheme, ECDSA, and others. The signed message 324 includes a digital signature purportedly generated by a user entity associated with an identification value I. The signature verification module 350 can receive the implicit certificate 322 from the terminal module 306 or retrieve the implicit certificate 322 associated with the identification value I from another source. The signature verification module 350 can generate the modified message 319 based on any suitable information, such as, for example, the public key reconstructed from public key reconstruction data in the implicit certificate 322. For example, the signature verification module 350 can compute the public key B based on the public key reconstruction data P, the implicit certificate 322, and a public key C of the certificate authority.

In the example shown in FIG. 3, the signature verification module 350 receives the message 318 as part of the signed message 324. The signature verification module 350 can extract the message 318 from the signed message 324 and provide the message 318 to the modification module 352. The modification module 352 can generate the modified message 319 based on the message 318 and the additional information that was used by the modification module 344 to generate the modified message 319. The terminal module 306 can compare the modified message 319 generated by the modification module 352 with the modified message 319 verified using the digital signature. The terminal module can verify the authenticity of the signed message 324, for example, if the two modified messages 319 match. The signed message can be verified by additional or different techniques. For example, in some cases the signed message 324 includes the modified message 319 instead of the original message 318. In such cases, the signed message can be verified based in part on generating the original message 318 from the modified message 319, for example, using the signer's public key information.

The certificate authority module 304 includes a certificate generation module 330 and possibly other modules. The certificate authority module 304 can perform one or more operations for issuing the implicit certificate 322 for use in the cryptography system 300. The certificate generation module 330 can generate the implicit certificate 322, for example, in response to receiving the certificate request 320.

The certificate generation module 230 generates the implicit certificate 322 based on the information in the certificate request 320. For example, the certificate generation module 230 can select a random value k and generate public key reconstruction data P by computing $P=R_U+kG$, where $R_U$ is the elliptic curve point generated by the request generation module 340 and included in the certificate request 320. The certificate authority module 304 may have a random number generator module that generates random numbers. The certificate generation module 330 can encode the public key reconstruction data P, and sometimes other information, in an implicit certificate $Cert_U$. The implicit certificate $Cert_U$ can be generated by a certificate encoding scheme, for example, a fixed-length field scheme, a minimal ASN.1 encoding scheme, an X.509-compliant ASN.1 encoding scheme, or another scheme.

In some instances, a certificate verification module at the certificate authority module 304 can receive the information generated by the certificate generation module 330 and verify that the implicit certificate $Cert_U$ complies with security rules and settings. If the implicit certificate $Cert_U$ is approved, the implicit certificate $Cert_U$ can be published as the implicit certificate 322. If the implicit certificate $Cert_U$ is not approved, a new implicit certificate $Cert_U{}'$ can be generated by the certificate generation module 330 and verified.

Figure 4:
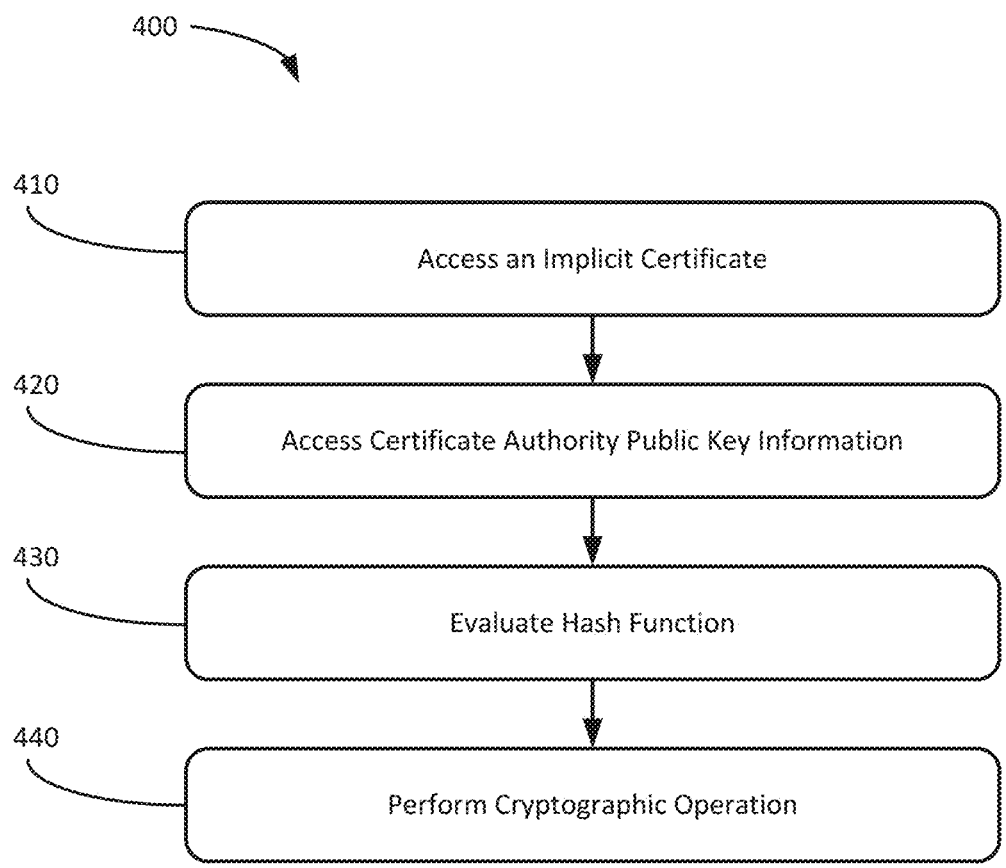
FIG. 4 is a flow chart showing an example technique for performing operations in a cryptography system.

FIG. 4 is a flow chart showing an example process 400 for performing an operation in a cryptography system. The process 400 can be implemented by a certificate authority, a correspondent, or any suitable combination of these and other entities of a cryptography system. In some instances, the process 400 can be implemented by the terminal modules 302, 306 or the certificate authority module 304 shown in FIG. 3. The process 400 can include operations performed by a computing system. For example, the operations can be performed by the terminals or the certificate authority servers shown in FIGS. 1 and 2. The example process 400 shown in FIG. 4 can be implemented using additional, fewer, or different operations, which can be performed in the order shown or in a different order. In some implementations, one or more of the operations can be repeated or iterated, for example, until a terminating condition is reached.

At 410, an implicit certificate is accessed. The implicit certificate can be accessed, for example, by reading the implicit certificate from memory, receiving the implicit certificate from a remote source, generating the implicit certificate from other data, or in another manner. The implicit certificate can be an implicit certificate that was generated by a certificate authority. The certificate authority can be any suitable certificate authority, such as, for example, a root certificate authority, an intermediate certificate authority, or any subordinate certificate authority.

The implicit certificate is associated with an entity. For example, the implicit certificate can be associated with a user, a terminal, a location, a software module, etc. The entity can be a certificate authority server, a correspondent terminal, or any suitable device or system component. In some cases, the certificate authority that generated the implicit certificate is a root certificate authority or an intermediate certificate authority, and the entity is a correspondent or another certificate authority that is subordinate to the root certificate authority. The implicit certificate can be based on a chain of implicit certificates. For example, when the certificate authority that generated the implicit certificate is an intermediate or other subordinate certificate authority, the implicit certificate can be based on one or more other implicit certificates that were issued by superior certificate authorities. The implicit certificate of the entity may include an identifier of the entity, a public key reconstruction value of the entity, or any suitable combination of these and other information.

At 420, certificate authority public key information is accessed. The certificate authority public key information can be accessed, for example, by reading the information from memory, receiving the information from a remote correspondent, generating the information from other data, or in another manner. In some cases, the certificate authority public key information includes the public key value of the certificate authority that issued the implicit certificate accessed at 410, the public key reconstruction value of the certificate authority that issued the implicit certificate accessed at 410, public key information of another certificate authority, or a combination of these and other information.

At 430, a hash function is evaluated. Any suitable hash function can be used. Examples of hash functions include the SHA family of hash functions (SHA-1, SHA-256, etc.), and others. The hash function can be evaluated by any suitable data processing apparatus. For example, the hash function may be evaluated by a general purpose processor, a main processor, a special purpose processor, or any suitable combination of one or more processors. Evaluating the hash function can produce a hash value.

The hash function can be evaluated based on the certificate authority public key information and the public key reconstruction value of the entity. In some instances, the hash function can be evaluated based on the certificate authority's public key, the certificate authority's public key reconstruction value, or a combination of these and any other certificate authority public key information. The hash function may take any suitable combination of inputs. In some examples, the hash function may be expressed $H(P_1, I_1, P_2, I_2)$, where $P_1$ represents the certificate authority's public key reconstruction value, $I_1$ represents an identifier of the certificate authority, $P_2$ represents the entity's public key reconstruction value, and $I_2$ represents an identifier of the entity. As another example, the hash function may be expressed as a has chain $H(H(P_1,I_1),P_2,I_2)$. As another example, the hash function may be expressed $H(C_1,P_2,I_2)$ where $C_1$ represents the public key value of the certificate authority.

In some implementations, the hash function is evaluated based on public key information for multiple certificate authorities. For example, in cases where the entity's implicit certificate was generated by a subordinate certificate authority, the hash function may be evaluated based on the public key information of the subordinate certificate authority, as well as the public key information of a superior certificate authority (e.g., a root or intermediate certificate authority). In some cases, the hash function may be expressed $H(P_1,I_1,P_2,I_2,P_3,I_3)$, where $P_2$ represents the subordinate certificate authority's public key reconstruction value, $I_2$ represents an identifier of the subordinate certificate authority, $P_1$ represents the superior certificate authority's public key reconstruction value, $I_1$ represents an identifier of the superior certificate authority, $P_3$ represents the entity's public key reconstruction value, and $I_3$ represents an identifier of the entity. In some cases, the hash function may be expressed as a hash chain $H(H(H(P_1,I_1),P_2,I_2),P_3,I_3)$.

At 440, a cryptographic operation is performed. The cryptographic operation can be performed based on a hash value produced by the hash function at 430. For example, the cryptographic operation can use the hash value, a value derived or computed from the hash value, or any suitable combination of these and other inputs. The cryptographic operation can be performed based on additional or different information, as appropriate.

The cryptographic operation can the can include any suitable operation performed in a cryptography system. For example, the cryptographic operation can be part of, or can be performed in association with, a data authentication protocol, a data secrecy protocol, a certificate generation protocol, or another type of protocol. In some cases, the cryptographic operation can be part of, or can produce information used by, an encryption algorithm, a decryption algorithm, a digital signature generation algorithm, a digital signature verification algorithm, or another type of algorithm. The cryptographic operation can produce any suitable output. Some cryptographic operations may produce the entity's public key, a digital signature, verification of a digital signature, an encrypted message, a decrypted message, or another type of output.

As an example, the cryptographic operation can include generating a public key value of the entity. The public key value can be generated based on the hash value produced by the hash function at 430, or the public key value can be generated based on another value that is calculated or derived from the hash value. In some instances, the public key value of the entity can be generated as part of validating the public key value, verifying a digital signature purportedly produced by the entity, decrypting a message from the entity, or another cryptographic operation. In some cases, generating the public key value produces the public key value as an output value, which can be stored or deleted, transmitted, used in further computation, or otherwise.

In some cases, the public key value can be generated implicitly, for example, by evaluating a cryptographic function that uses or otherwise relies on the public key value. The cryptographic function may receive the public key value as an input. In some instances, the cryptographic function receives as inputs values that can be used to compute the public key value, and the cryptographic function can use these input values in place of the actual public key value, e.g., in a mathematically equivalent manner. As such, the cryptographic function may use the public key value without explicitly receiving the public key value as an input. Accordingly, in some instances, evaluating the cryptographic function that uses or otherwise relies on the public key value does not explicitly compute the public key value.

Figure 5:
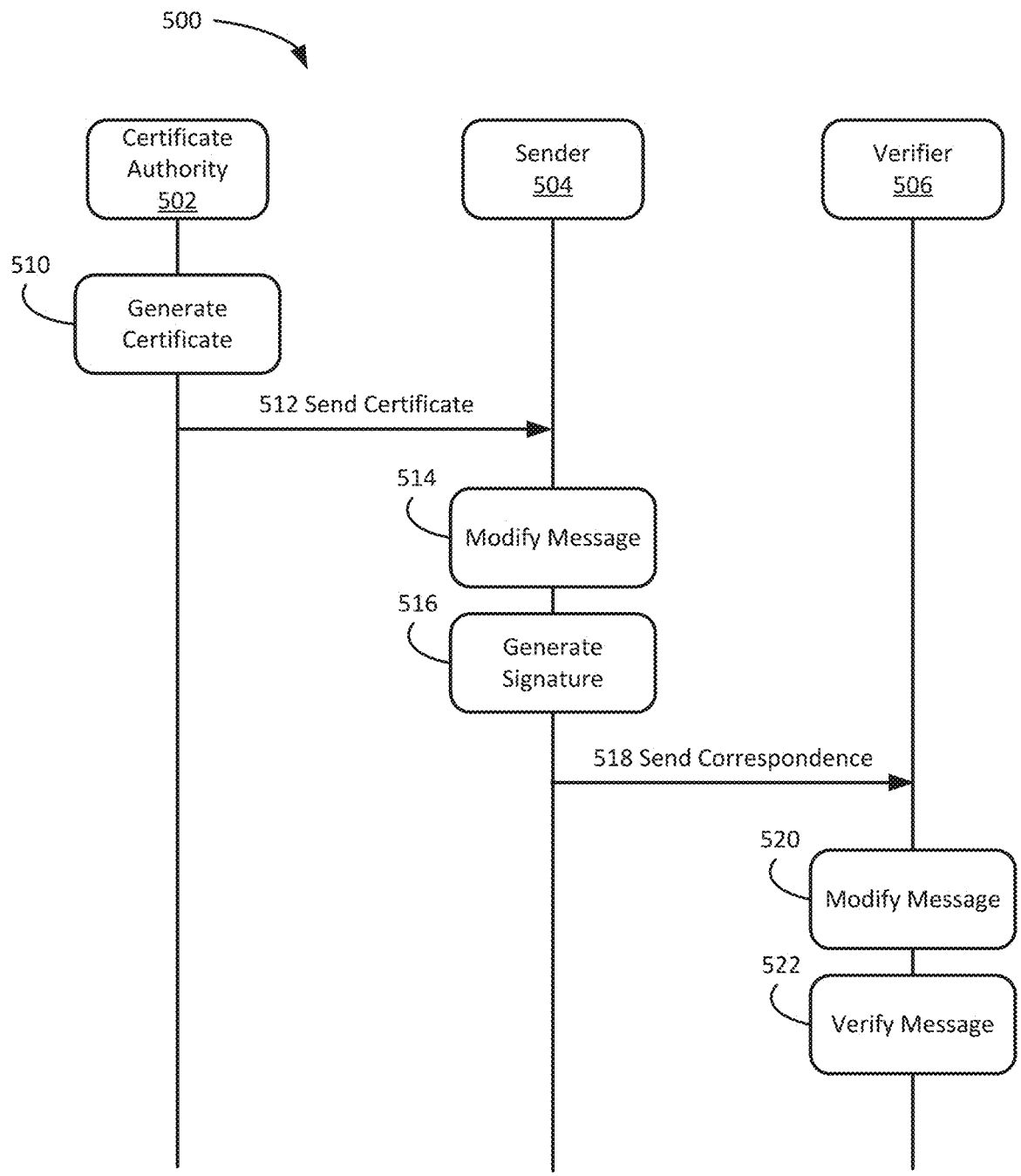
FIG. 5 is a flow chart showing an example technique for using digital signatures.

FIG. 5 is a flow chart showing an example process 500 for using digital signatures. The process 500 can be implemented by a certificate authority, a correspondent, or any suitable combination of these and other entities of a cryptography system. In some instances, aspects of the process 500 can be implemented by the terminal modules 302, 306 or the certificate authority module 304 shown in FIG. 3, or a combination of them. The process 500 can include operations performed by multiple entities in a communication system. For example, operations can be performed by one or more of the terminals or the certificate authority servers shown in FIGS. 1 and 2, or by a combination of them. The example process 500 shown in FIG. 5 can be implemented using additional, fewer, or different operations, which can be performed in the order shown or in a different order. In some implementations, one or more of the operations can be repeated or iterated, for example, until a terminating condition is reached.

FIG. 5 shows operations being performed by a certificate authority 502, a sender 504, and a verifier 506. As an example, the operations of the certificate authority 502 can be executed by a certificate authority server, the operations of the sender 504 can be executed by a first terminal, and the operations of the verifier 506 can be executed by second terminal. In some cases, additional or different components or computing apparatus may execute one or more operation of the example process 500.

At 510, the certificate authority 502 generates a digital certificate. The certificate authority 502 can be any suitable certificate authority (e.g., a root certificate authority, a subordinate certificate authority, etc.). The digital certificate can be an implicit certificate, an explicit certificate, or any other type of digital certificate. The digital certificate can include a public key reconstruction value of an entity, an identifier for the entity, or any suitable combination of these or other information. In the example process 500 shown in FIG. 5, the digital certificate generated by the certificate authority 502 includes a public key reconstruction value of the sender 504.

At 512, the digital certificate is communicated to the sender 504. The digital certificate can be communicated in any suitable manner. For example, the digital certificate can be communicated over a data communication network, transmitted over a wireless or wired communication link, transported on a disk or other computer-readable medium, or any suitable combination. In the example shown in FIG. 5, the sender 504 receives the digital certificate from the certificate authority 502.

At 514, the sender 504 modifies a message to be signed. The message can be modified based on the digital certificate. The sender 504 can access the digital certificate and the message, for example, by reading one or more of them from memory, by receiving one or more of them from a remote device, by generating one or more of them locally, or by any suitable combination of these and other techniques for accessing data. Modifying the message to be signed produces a first modified message.

The first modified message can be generated by any suitable technique. The sender 504 may generate the first modified message by generating a hash value based on the sender's digital certificate and combining the hash value with the message. The sender 504 may generate the first modified message by combining the message with the sender's public key reconstruction value. The sender 504 may generate the first modified message by combining the message with another value. The other value can be based on information in the signer's digital certificate and possibly other information. For example, the other value can be produced from the signer's public key reconstruction value, the signer's public key value, the signer's identifier, other information included in the digital certificate, or any suitable combination.

In some instances, the first modified message is generated by combining the message with a certificate authority's public key information. For example, the first modified message may be generated based on both the signer's digital certificate and the certificate authority's public key. When the certificate authority 502 is subordinate to another certificate authority (e.g., a root certificate authority, an intermediate certificate authority, etc.), the first modified message can be generated by combining the message with a value produced from the signer's public key reconstruction value and one or more other values. The other values may include, for example, a public key the certificate authority 502, a public key of a superior certificate authority, a digital certificate of the certificate authority 502, a digital certificate of the superior certificate authority, etc.

At 516, the sender 504 generates a digital signature. The digital signature can be generated based on the modified message. In some instances, the digital signature can be generated based on additional or different information. The digital signature may be generated according to any suitable signature algorithm or other appropriate technique.

At 518, the digital signature and other information are communicated to the verifier 506. In some cases, the information communicated to the verifier 506 includes the message (i.e., the unmodified message). In some cases, the information communicated to the verifier 506 includes the first modified message. In any event, the digital signature can be communicated together with the other information, or the digital signature can be communicated separately. In some instances, the sender 504 also sends the sender's digital certificate to the verifier 506, or the verifier 506 may obtain the sender's digital certificate from another source. The information communicated from the sender 504 to the verifier 506 can be communicated in any suitable manner. For example, the information can be communicated over a data communication network, transmitted over a wireless or wired communication link, transported on a disk or other computer-readable medium, or any suitable combination. In the example shown in FIG. 5, the verifier 506 receives the information from the sender 504.

The verifier 506 may obtain the message (i.e., the unmodified message) directly from sender 504, or the verifier 506 may derive the message from other information provided by the sender 504. In some implementations, at 518 the sender communicates the first modified message to the verifier 506, and the verifier 506 extracts the original, unmodified message from the first modified message. The verifier 506 may obtain the original, unmodified message in any suitable manner.

At 520, the verifier 506 accesses the original, unmodified message and modifies the message. The message can be modified based on information included in the sender's digital certificate. The verifier 506 can access the digital certificate and the message, for example, by reading one or more of them from memory, by receiving one or more of them from a remote device, by generating one or more of them locally, or by any suitable combination of these and other techniques for accessing data. When the verifier 506 modifies the message, the verifier 506 produces a second modified message.

The second modified message can be generated by any suitable technique. In the example process 500 shown in FIG. 5, the verifier 506 modifies the message at 520 in the same manner that the sender 504 modified the message at 514. For example, the sender 504 and the verifier 506 can each modify the message according to a predetermined or prearranged algorithm. As such, the second modified message produced at 520 by the verifier 506 can be identical to the first modified message produced at 514 by the sender 504.

In some implementations, the verifier 506 generates the second modified message by generating a hash value based on the sender's digital certificate and combining the hash value with the message. The verifier 506 may generate the second modified message by combining the message with the sender's public key reconstruction value. The verifier 506 may generate the second modified message by combining the message with another value. The other value can be based on information in the signer's digital certificate and possibly other information. For example, the other value can be produced from the signer's public key reconstruction value, the signer's public key value, the signer's identifier, other information included in the digital certificate, or any suitable combination.

In some instances, the second modified message is generated by combining the message with a certificate authority's public key information. For example, the second modified message may be generated based on both the signer's digital certificate and the certificate authority's public key. When the certificate authority 502 is subordinate to another certificate authority, the second modified message can be generated by combining the message with a value produced from the signer's public key reconstruction value and one or more other values. The other values may include, for example, a public key of the certificate authority 502, a public key of a superior certificate authority, a digital certificate of the certificate authority 502, a digital certificate of the superior certificate authority, etc.

At 522, the verifier 506 verifies the message. The message is verified based on the digital signature generated at 516 by the sender 504 and based on the second modified message generated at 520 by the verifier 506. In some instances, the message can be verified based on additional or different information. The message can be verified based on in part any suitable signature verification algorithm or other appropriate technique. Verifying the message can provide the verifier 506 assurance of message authenticity. For example, successfully verifying the message may indicate that the message is an authentic communication from the sender 504, and has not been altered or forged.

In some cases, the verifier 506 uses the digital signature to verify the first modified message produced by the sender 504, and the verifier 506 then compares the first modified message to the second modified message. In some instances, the first modified message is verified based on the digital certificate according to a verification algorithm that corresponds to the digital signature algorithm used by the sender to generate the digital signature at 516. If the first modified message can be verified based on the digital signature, and if the first modified message matches the second modified message, the verifier 506 can accept the message (i.e., the unmodified) as authentic. If the first modified message cannot be verified based on the digital signature, or if the first modified message does not match the second modified message, the verifier 506 can reject the message as inauthentic.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple cards, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, an implicit certificate is accessed. The implicit certificate is associated with an entity and generated by a certificate authority. The implicit certificate includes a public key reconstruction value of the entity. Certificate authority public key information associated with the certificate authority is accessed. A first value is generated based on evaluating a hash function. The hash function is evaluated based on the certificate authority public key information and the public key reconstruction value of the entity. A public key value of the entity is generated based on the first value.

Implementations of these and other aspects may include one or more of the following features. The certificate authority is a root certificate authority, and the entity is a second certificate authority that is subordinate to the root certificate authority. The certificate authority is an intermediate certificate authority that is subordinate to a root certificate authority, and the entity is a second certificate authority that is subordinate to the intermediate certificate authority. The implicit certificate is based on a chain of implicit certificates. The certificate authority is a root certificate authority and the entity is a user entity.

Additionally or alternatively, implementations of these and other aspects may include one or more of the following features. Generating the public key value includes validating the public key value, using the public key value to verify a digital signature from the entity, or both. Generating the public key value includes implicitly generating the public key value as part of evaluating a cryptographic function that uses the public key value. Generating the public key value or evaluating the cryptographic function may or may not explicitly compute the public key value.

Additionally or alternatively, implementations of these and other aspects may include one or more of the following features. The first value and the public key value are generated by the entity. The first value and the public key value are generated by the certificate authority. The first value and the public key value are generated by a second, different entity that relies on the public key value. The certificate authority public key information includes a public key value of the certificate authority, a public key reconstruction value of the certificate authority, or both.

Additionally or alternatively, implementations of these and other aspects may include one or more of the following features. The certificate authority is a subordinate certificate authority. Additional certificate authority public key information associated with a root certificate authority is accessed. The first value is generated based on evaluating the hash function based on the certificate authority public key information of the subordinate certificate authority, the additional certificate authority public key information of the root certificate authority, and the public key reconstruction value of the entity.

In some aspects, an implicit certificate associated with an entity is accessed. The implicit certificate includes a public key reconstruction value of the entity. A message for digital signature by the entity is accessed. A modified message is generated by combining the message with a value based on the implicit certificate. A digital signature is generated based on the modified message.

In some aspects, a digital signature generated by an entity is accessed. A message to be verified based on the digital signature is accessed. An implicit certificate associated with the entity is accessed. A modified message is generated by combining the message with a value based on the implicit certificate. The message is verified based on the digital signature and the modified message.

Implementations of these and other aspects may include one or more of the following features. The modified message is generated by generating a hash value based on the implicit certificate of the entity and combining the hash value with the message. The message and the digital signature are sent to a recipient over a data communication network. The modified message is generated by combining the message with the public key reconstruction value of the entity. The modified message is generated by combining the message with a value based on the public key reconstruction value of the entity and additional information included in the implicit certificate.

Additionally or alternatively, implementations of these and other aspects may include one or more of the following features. Accessing the implicit certificate includes accessing an implicit certificate issued by a certificate authority. The modified message is generated by combining the message with a value based on the implicit certificate and a public key value of the certificate authority. Accessing the implicit certificate includes accessing an implicit certificate issued by a first certificate authority that is subordinate to a second certificate authority. The modified message is generated by combining the message with a value based on the public key reconstruction value of the entity and one or more other value. The other values include a public key of the first certificate authority, a public key of the second certificate authority, an implicit certificate of the first certificate authority, an implicit certificate of the second certificate authority, or a combination thereof.

Additionally or alternatively, implementations of these and other aspects may include one or more of the following features. A verifier receives a first modified message from the entity over a data communication network. The modified message generated by combining the message with a value based on the implicit certificate is a second modified message. Verifying the message includes using the digital signature to verify the first modified message according to a verification algorithm. Verifying the message includes comparing the first modified message to the second modified message. Accessing the message includes deriving the message from the first modified message.

Thus, implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A first terminal, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   receiving, by the first terminal, a first modified message and a digital signature from a second terminal over a data communication network;
   obtaining, by the first terminal, an unmodified message associated with the first modified message;
   obtaining, by the first terminal, an implicit certificate associated with the second terminal, wherein the implicit certificate includes a public key reconstruction value of the second terminal, the public key reconstruction value of the second terminal is different than a public key of the second terminal, and the public key of the second terminal is reconstructed using the public key reconstruction value of the second terminal and a public key of a certificate authority;
   generating, by the first terminal, a hash value based on the implicit certificate;
   generating, by the first terminal, a second modified message by combining the unmodified message with the hash value and the public key reconstruction value of the second terminal; and
   verifying, by the first terminal, the unmodified message based on the digital signature and the second modified message.

2. The first terminal of claim 1, wherein verifying the unmodified message comprises: comparing the first modified message to the second modified message.

3. The first terminal of claim 1, wherein obtaining the unmodified message comprises deriving the unmodified message from the first modified message.

4. The first terminal of claim 1, wherein the second modified message is generated by combining the unmodified message with a value based on additional information included in the implicit certificate.

5. The first terminal of claim 1, wherein obtaining the implicit certificate comprises accessing an implicit certificate issued by the certificate authority, and the second modified message is generated by combining the unmodified message with a value based on the public key of the certificate authority.

6. The first terminal of claim 1, wherein obtaining the implicit certificate comprises accessing an implicit certificate issued by a first certificate authority that is subordinate to a second certificate authority, and the second modified message is generated by combining the unmodified message with at least one of:
   a public key of the first certificate authority;
   a public key of the second certificate authority;
   an implicit certificate of the first certificate authority; or
   an implicit certificate of the second certificate authority.

* * * * *